US012460781B1

(12) United States Patent
Pan

(10) Patent No.: US 12,460,781 B1
(45) Date of Patent: Nov. 4, 2025

(54) LED VEHICLE LAMP

(71) Applicant: Zhuhai Zhengyuan Optoelectronic Technology Co., Ltd., Guangdong (CN)

(72) Inventor: Dianbo Pan, Guangdong (CN)

(73) Assignee: ZHUHAI ZHENGYUAN OPTOELECTRONIC TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 19/071,160

(22) Filed: Mar. 5, 2025

(30) Foreign Application Priority Data

Aug. 27, 2024 (CN) ........................ 202422090344.8

(51) Int. Cl.
*F21S 41/19* (2018.01)
*F21S 41/143* (2018.01)

(52) U.S. Cl.
CPC .......... *F21S 41/192* (2018.01); *F21S 41/143* (2018.01)

(58) Field of Classification Search
CPC ....... F21S 41/192; F21S 41/143; F21K 9/232; F21K 9/23; F21K 9/61; F21K 9/66; F21K 9/69; F21V 29/83; F21V 29/506; F21V 2200/40; F21V 5/04; G02B 6/10
See application file for complete search history.

(56) References Cited

U.S. PATENT DOCUMENTS 3,188,458 A * 6/1965 Hickman ................ F21V 29/00 165/53
2003/0185005 A1* 10/2003 Sommers ............... G08G 1/095 362/240
2016/0356428 A1* 12/2016 Edmond ................ F21K 9/238

* cited by examiner

*Primary Examiner* — Omar Rojas Cadima
(74) *Attorney, Agent, or Firm* — MUNCY, GEISSLER, OLDS & LOWE, P.C.

(57) ABSTRACT

The present invention provides an LED vehicle lamp, which includes a first circuit board, wherein an LED chip is provided on the first circuit board, a light guide member is provided on one side of a light emitting surface of the LED chip, the light guide member is transparent and positioned right above the LED chip, light transmission members are provided outside the light guide member, the first circuit board and the LED chip, each of the light transmission members includes a top wall and a transparent peripheral wall, at least one first heat dissipation hole is provided on the top wall, and stripes extending along a horizontal direction are provided on the peripheral wall of the light transmission member.

15 Claims, 15 Drawing Sheets

III

LED VEHICLE LAMP

TECHNICAL FIELD

The present invention relates to the field of automotive parts, and in particular, to an LED vehicle lamp.

BACKGROUND

At present, LED vehicle lamps have shown significant advantages over conventional halogen lamps and high-intensity discharge (HID) lamps due to low-voltage operation, uniform light distribution, stable service life, instantaneous lighting, and natural and soft light. These advantages not only improve driving safety, but also promote the wide adoption and application of LED technology in the field of automotive lighting.

However, since an LED chip emits light directly forward, the emitted light cannot be emitted from the sides, resulting in low paving light efficiency and failing to achieve the lighting effect comparable to that of xenon lamps and halogen lamps. Therefore, an existing LED vehicle lamp is provided with a lens to enhance light intensity function of the side rear of the LED vehicle lamp.

However, in actual use, it is found that the lens absorbs part of the light and converts the light into heat during the process of transmitting light, and the lens is damaged due to high temperature after long-term use. In addition, although the arrangement of the lens increases light beams emitted by the LED chip to the side rear, it is still unable to achieve comparable lighting effects to that of current conventional vehicle lamps such as halogen lamps and xenon lamps.

SUMMARY

An objective of the present invention is to provide an LED vehicle lamp, which is used to solve the problems of low service life and poor lighting effect of the existing vehicle lamp with a light guide member.

To achieve the objective of the present invention, the LED vehicle lamp provided by the present invention includes a first circuit board, wherein an LED chip is provided on the first circuit board, a light guide member is provided on one side of a light emitting surface of the LED chip, the light guide member is a transparent and positioned right above the LED chip, light transmission members are provided outside the light guide member, the first circuit board and the LED chip, each of the light transmission members includes a top wall and a peripheral wall, the peripheral wall is transparent, at least one first heat dissipation hole is provided on the top wall, and stripes extending along a horizontal direction are provided on the peripheral wall of the light transmission member.

According to the above embodiment, the LED vehicle lamp of the present invention provides stripes on the peripheral wall of the light transmission member, so that passing light is diffused and irradiated to a side rear, light beams emitted by the LED chip and emitted to the side rear are improved, and 360° uniform light emission is achieved. The lighting effect comparable to that of the conventional vehicle lamps such as halogen lamps and xenon lamps is achieved by the double light distribution effect of the light guide member and the light transmission member. Meanwhile, the first heat dissipation hole on the top wall of the light transmission member improves the heat dissipation effect and prevents the light guide member from absorbing part of the light and converting the light into heat during the light transmission process, thereby preventing the light guide member from being damaged by high temperature after long-term use.

In a further embodiment, the peripheral wall of the light transmission member is provided with at least one notch, and the notch is formed by extending upward from a bottom edge of the peripheral wall.

According to the above embodiment, during the long-term use of the LED chip, a light source surface radiates air to generate hot air gathering in an area above the LED chip, and this area is small and the temperature rises quickly. When the temperature rises to 120° C. to 150° C., the light transmission member provided outside deforms and bubbles, which not only affects the light transmittance, but also causes the light transmission member to melt after long-term use, affecting the service life of the LED vehicle lamp. According to the present invention, the notch is arranged on the peripheral wall of the light transmission member, and the notch is formed by extending upward from a bottom edge of the peripheral wall, which is closer to the LED chip, i.e., a light emission source, so that a better heat dissipation effect is achieved, the generated hot air can be diffused and cooled as soon as possible, and deformation and damage to the light transmission member are avoided.

In a further embodiment, the LED vehicle lamp further includes a second circuit board, the second circuit board is perpendicular to and electrically connected to the first circuit board, the first circuit board is circumferentially provided with a first mounting groove, an extending portion is provided at one end of the second circuit board close to the first circuit board, and at least a part of the extending portion extends into the first mounting groove and abuts against the first mounting groove; and one end of the second circuit board far away from the first circuit board is provided with an abutting contact pin.

In a further embodiment, the second circuit board is an aluminum board.

According to the above embodiment, the arrangement of the second circuit board is convenient to mount the LED vehicle lamp. Meanwhile, the second circuit board may also provide good thermal and electrical conductivity. The second circuit board is preferably an aluminum board, which has excellent thermal conduction performance, and can conduct heat of a high-power LED chip more quickly.

In a further embodiment, a first through hole is provided on the second circuit board along a horizontal direction, and a fan is provided in the first through hole.

According to the above embodiment, the fan further improves the heat dissipation effect of the LED vehicle lamp and ensures the service life of the LED vehicle lamp. The fan is positioned closer to the LED chip, which can take away the heat more effectively and improve the heat dissipation efficiency. Therefore, the LED vehicle lamp can adapt to greater power without chaotic flashing, which solves the problem that many vehicle models on the market cannot work normally, flash faster, or report fault lights due to insufficient LED power and fault judgment by the on-board computer. Meanwhile, the fan is arranged on a back side of a light emitting surface of the LED chip, compared with the common LED vehicle lamp on the market that provides a fan on a top to dissipate heat for an LED chip on multiple surfaces, this avoids the problem of severe light blocking and dark areas caused by the fans. With the arrangement of the fan position, the problem of dark areas is further solved and the lighting efficiency is improved.

Further, the fan is a turbofan.

According to the above embodiment, the turbofan can output a large amount of air in a small space and blow the air to the side, which can achieve a good heat dissipation effect and has low operating noise.

In a further embodiment, a first protrusion extending toward the inside of the first through hole in a horizontal direction is provided on a side wall of the first through hole in a vertical direction, the fan is provided with a mounting plate, the mounting plate is arranged on the first protrusion, and the mounting plate is electrically connected to the second circuit board.

According to the above embodiment, the fan is connected to the second circuit board in a mode that a size and a length of the LED are reduced, and meanwhile, the stability of electric connection between the fan and the second circuit board is ensured.

In a further embodiment, the second circuit board is externally provided with a first shell and a second shell mutually connected, and the first shell is positioned above the second shell; the second shell is provided with a second through hole, and the abutting contact pin extends out of the second through hole.

According to the above embodiment, the arrangement of the first shell and the second shell ensures the use safety and stability of the LED vehicle lamp, and meanwhile, the arrangement of the two shells is convenient for mounting.

In a further embodiment, the first shell is positioned below the light transmission member, a second protrusion extends along a vertical direction from one end of the first shell close to the light transmission member, and a third protrusion extending outward is provided on an outer peripheral wall of the second protrusion; and an inner peripheral wall of the light transmission member is provided with a groove, and the groove is matched with the third protrusion.

According to the above embodiment, the light transmission member is connected to the first shell in a mode that the light transmission member is stably arranged on the first shell.

In a further embodiment, the first circuit board is arranged on a top surface of the first shell, a gap communicated with the first shell is formed on the top surface, and the extending portion of the second circuit board passes through the gap.

According to the above embodiment, the arrangement of the first shell ensures the stability of the position of the first circuit board while ensuring the stability of the electric connection between the first circuit board and the second circuit board.

In a further embodiment, a support is sleeved on a peripheral wall of the light guide member, and supporting legs extend from one surface of the support facing the first circuit board; and the first circuit board is circumferentially provided with a second mounting groove, and the supporting legs pass through the second mounting groove and abut against the top surface of the first shell.

According to the above embodiment, the arrangement of the support ensures that the positional relationship and the corresponding relationship between the light guide member and the LED chip remain unchanged, thereby ensuring the lighting stability of the LED vehicle lamp.

In a further embodiment, the support is provided with at least one third through hole, and the third through hole is arranged on the support along a circumferential direction of the light guide member.

According to the above embodiment, the arrangement of the third through hole further helps the LED chip and the light guide member to dissipate heat.

In a further embodiment, one surface of the light guide member far away from the LED chip is recessed toward a direction of the LED chip to form a recessed conical surface.

According to the above embodiment, the light distribution efficiency of the vehicle lamp can be effectively improved by reflecting the light beam through the recessed conical surface.

In a further embodiment, a cross section of the stripe is semicircular.

In a further embodiment, a cross section of the stripe is trapezoidal.

According to the above embodiment, the stripes with semicircular or trapezoidal cross sections enable passing light to be dispersed more uniformly, and the lighting effect irradiated to the side rear is better.

The present invention is further described below in conjunction with the accompanying drawings and embodiments.

DETAILED DESCRIPTION OF EMBODIMENTS

First Embodiment

Figure 1:
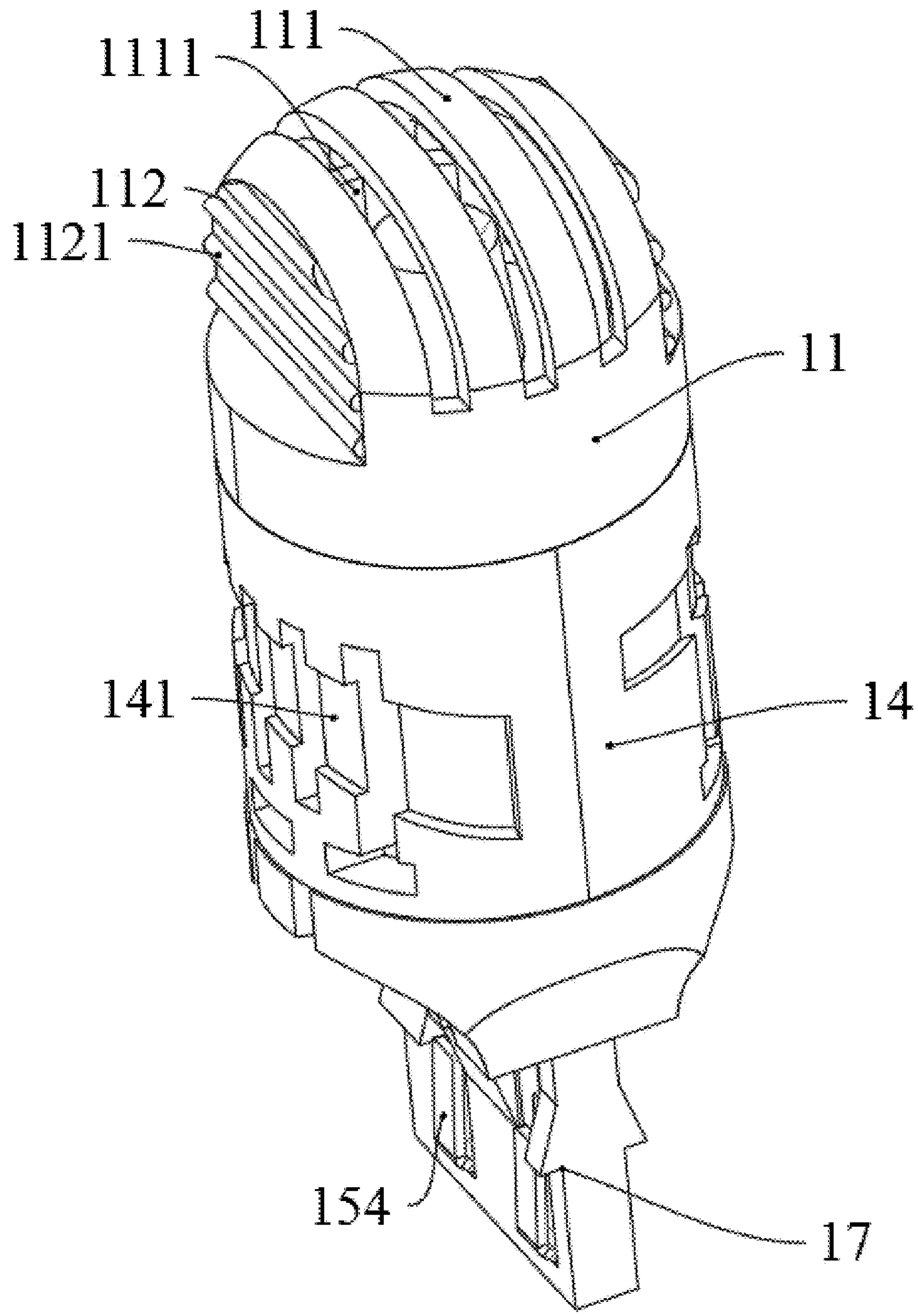
FIG. 1 is a structural view of an LED vehicle lamp according to a first embodiment.
Figure 2:
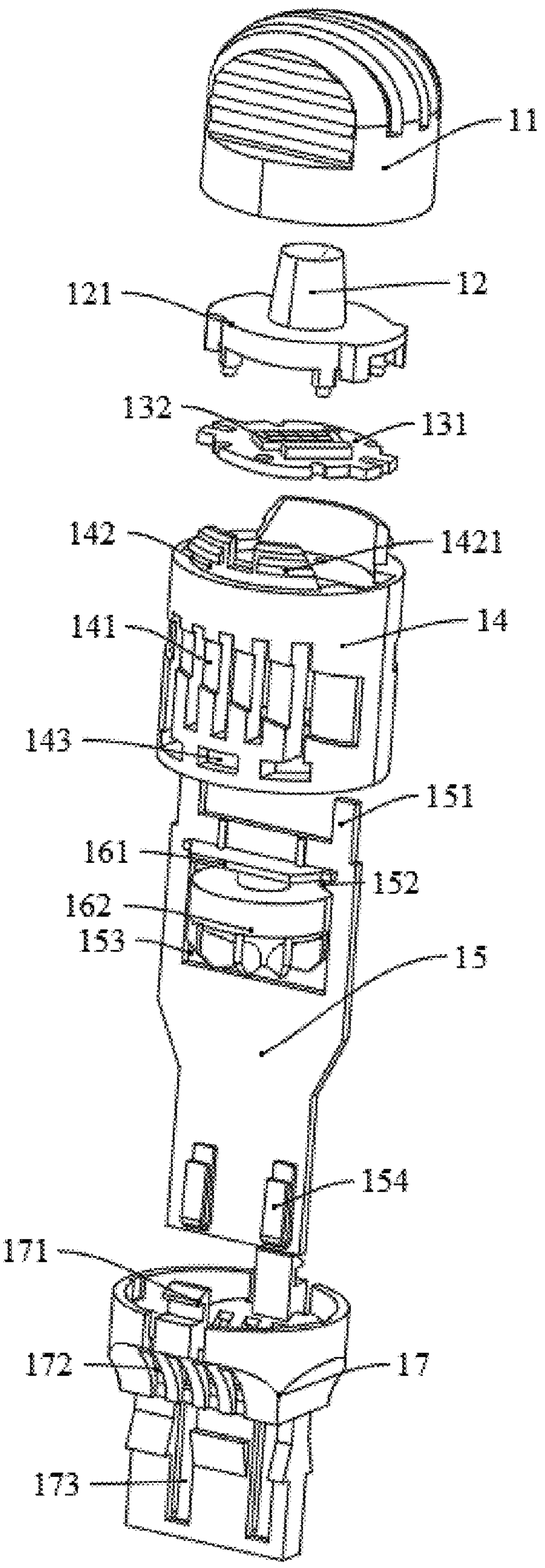
FIG. 2 is an exploded view of an LED vehicle lamp according to a first embodiment.
Figure 3:
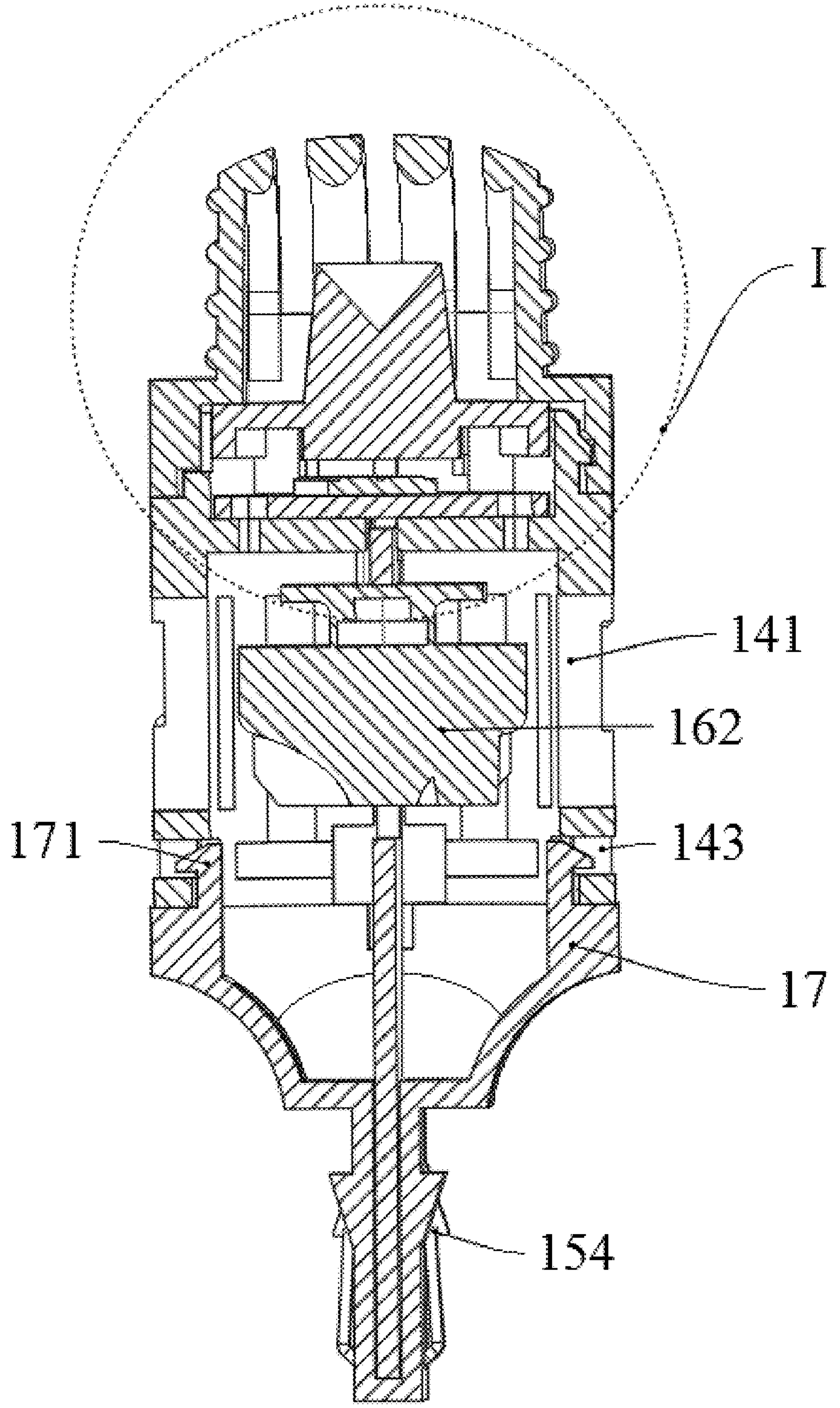
FIG. 3 is a cross-sectional view of an LED vehicle lamp according to a first embodiment.
Figure 4:
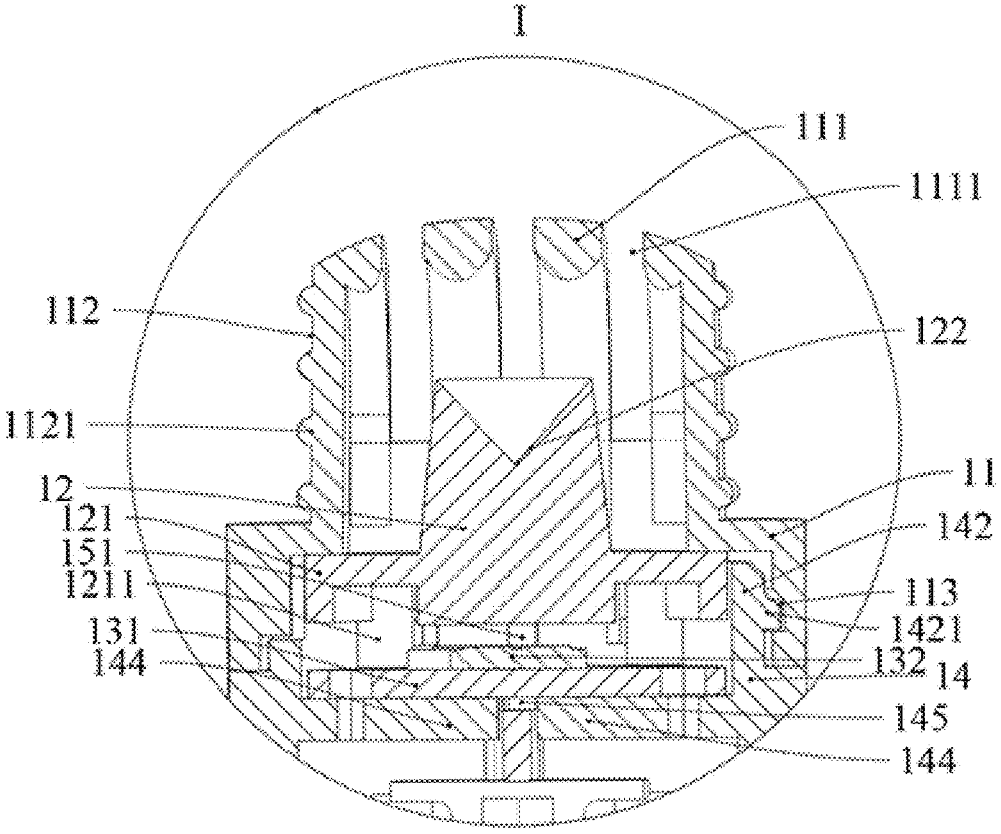
FIG. 4 is an enlarged view of I in FIG. 3.
Figure 5:
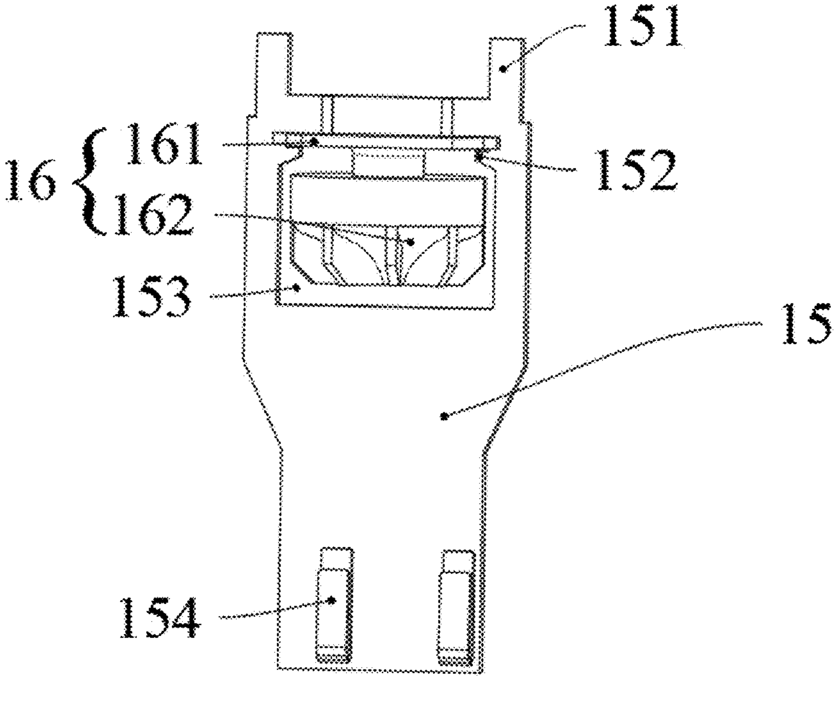
FIG. 5 is a structural view of a second circuit board and a fan according to a first embodiment.
Figure 6:
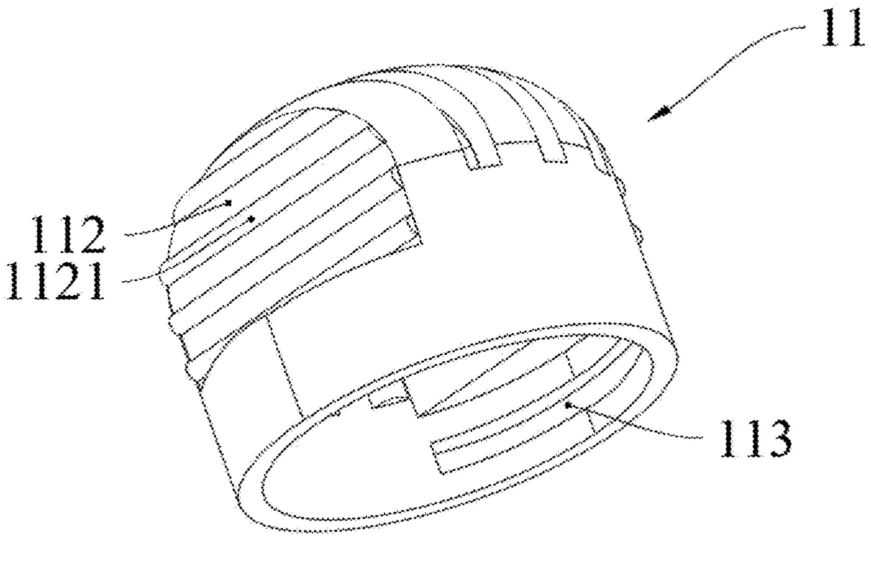
FIG. 6 is a structural view of a light transmission member according to a first embodiment.
Figure 7:
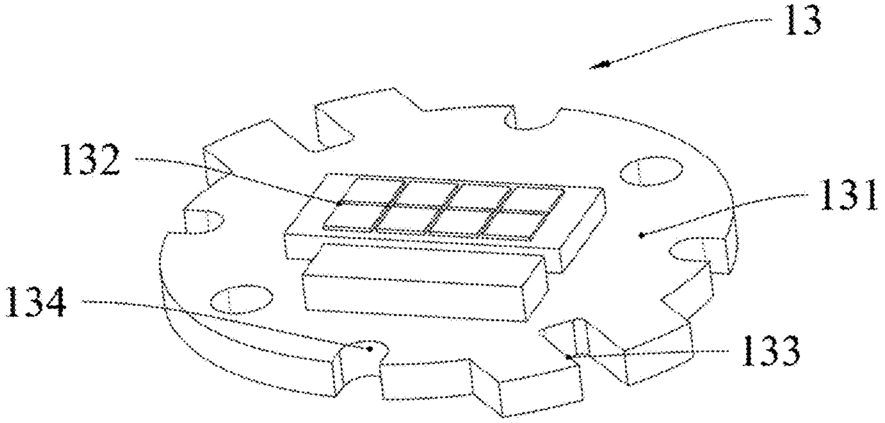
FIG. 7 is a structural view of a light emission source according to a first embodiment.
Figure 8:
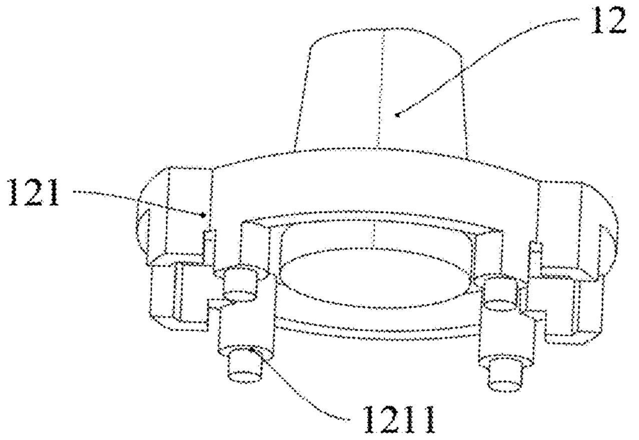
FIG. 8 is a structural view of a light guide member according to a first embodiment.

Referring to FIGS. 1 to 8, the LED vehicle lamp in this embodiment includes a light transmission member 11, a light guide assembly, a light emission source, a first shell 14, a second circuit board 15, a heat dissipation assembly, and a second shell 17. The first shell 14 is positioned above the second shell 17 and connected to the second shell 17, and the light transmission member 11 is sleeved above the first shell 14. The light guide member 12 and the light emission source are both positioned in the light transmission member 11, wherein the light guide member 12 is positioned above the light emission source. The second circuit board 15 and the heat dissipation assembly are positioned in an accommodation cavity formed by the first shell 14 and the second shell 17.

Referring to FIGS. 1 to 4, a peripheral wall of the first shell 14 is cylindrical, and a plurality of second heat dissipation holes 141 are provided on the peripheral wall. One end of the first shell 14 close to the light transmission member 11 is provided with a top surface 144, and the top surface 144 is provided with a gap 145 communicated with the accommodating cavity formed by the first shell 14 and the second shell 17, and a width of the gap 145 is equal to or greater than a thickness of the second circuit board 15. A clamping groove 143 is provided on the peripheral wall of the first shell 14 close to the second shell 17, a clamping buckle 171 is provided at one end of the second shell 17 close to the first shell 14, and the clamping buckle 171 and the clamping groove 143 are matched to achieve the connection between the first shell 14 and the second shell 17.

Referring to FIGS. 1 to 5, one end of the second circuit board 15 close to the top surface 144 of the first shell 14 is provided with an extending portion 151, and the extending portion 151 passes through the gap 145 of the first shell 14 along a vertical direction and extends out of the first shell 14. A first through hole 153 is provided on the second circuit board 15 along a horizontal direction, and a side wall of the first through hole 153 extending along a vertical direction is provided with a first protrusion 152 extending toward the inside of the first through hole 153 along a horizontal direction. A fan 16 is provided in the first through hole 153, the fan 16 includes a driving portion and a fan blade portion 162, the driving portion includes a mounting plate 161, and the mounting plate 161 is arranged on the first protrusion 152. The mounting plate 161 is electrically connected to the second circuit board 15. The driving portion drives the fan blade portion to rotate. A fin-shaped first heat sink is formed on the first shell 14, second heat dissipation holes 141 are also formed on the first heat sink, and each of the second heat dissipation holes 141 is positioned between two adjacent fins of the first heat sink. A fin-shaped second heat sink is formed on the second shell 17, third heat dissipation holes 172 are also formed on the second heat sink, each of the third heat dissipation holes 172 is positioned between two adjacent fins of the second heat sink, and the third heat dissipation holes 172 are positioned below the fan blade portion 162. An abutting contact pin 154 is provided at one end of the second circuit board 15 far away from the top surface 144 of the first shell 14. The second shell 17 is provided with a second through hole 173, and the abutting contact pin 154 extends out of the second through hole 173. The abutting contact pin 154 is configured to electrically connect to an external power supply. In this embodiment, the third heat dissipation hole 172 is an air inlet, the second heat dissipation hole 141 is an air outlet, and the fan 16 is a turbofan, so that the air can be blown out from the side to achieve a good heat dissipation effect.

Referring to FIGS. 1 to 6, a second protrusion 142 extends along a vertical direction from one end of the first shell 14 close to the light transmission member 11, and a third protrusion 1421 extending outward is provided on an outer peripheral wall of the second protrusion 142. An inner peripheral wall of the light transmission member 11 is provided with a groove 113, and the groove 113 is matched with the third protrusion 1421 to allow the light transmission member 11 to be sleeved on the first shell 14. The light transmission member 11 includes an approximately arc-shaped top wall 111 and two parallel planar peripheral walls 112, and the top wall 111 and the peripheral walls 112 are transparent. The top wall 111 of the light transmission member 11 is provided with a plurality of first heat dissipation holes 1111. In this embodiment, the first heat dissipation holes 1111 are through holes having arc-shaped cross sections. The two peripheral walls 112 of the light transmission member 11 are each provided with stripes 1121 extending along a horizontal direction. Preferably, the stripes 1121 have semicircular cross sections.

Referring to FIGS. 1 to 7, the light emission source includes a first circuit board 131 and an LED chip 132. The first circuit board 131 is arranged on the top surface 144 of the first shell 14, the LED chip 132 is soldered on the first circuit board 131, and the LED chip 132 may be fixed on the first circuit board 131 by other methods known to those skilled in the art. The first circuit board 131 is perpendicular to the second circuit board 15, the first circuit board 131 is circumferentially provided with a first mounting groove 133, and at least a part of the extending portion 151 of the second circuit board 15 extends into the first mounting groove 133. In this embodiment, the extending portion 151 of the second circuit board 15 passes through the first mounting groove 133. The extending portion 151 of the second circuit board 15 abuts against the first mounting groove 133 to electrically connect the first circuit board 131 to the second circuit board 15. Preferably, the second circuit board 15 in this embodiment is an aluminum board, which has good thermal and electrical conductivity.

Referring to FIGS. 1 to 8, the light guide assembly includes a light guide member 12, a support 121 is sleeved on a circumferential wall of the light guide member 12, and supporting legs 1211 extend from one surface of the support 121 facing the first circuit board 131. The first circuit board 131 is circumferentially provided with a second mounting groove 134, and the supporting legs 1211 pass through the second mounting groove 134 and abut against the top surface 144 of the first shell 14. The light guide member 12 is positioned directly above the LED chip 132, and a light emitting surface of the LED chip 132 faces the light guide member 12. The light guide member 12 is cylindrical or truncated cone-shaped, and the light guide member 12 is transparent. One surface of the light guide member 12 far away from the LED chip 132 is recessed to form a recessed conical surface 122, the recessed conical surface 122 is a surface of revolution and is recessed toward the LED chip 132, and an axis of the recessed conical surface 122 is positioned on a circumference of the light guide member 12. An area of the recessed conical surface 122 close to a vertex may be an electroplated area or an area coated with a high-reflection film, so that a light beam incident on this area can be reflected at the recessed conical surface 122. An area of the recessed conical surface 122 far away from a vertex may be a roughened area, such as a frosted area, so that the refraction direction of the light beam incident on the roughened area is changed.

The LED vehicle lamp in this embodiment provides stripes 1121 on the peripheral wall 112 of the light transmission member 11, so that passing light is diffused and irradiated to a side rear, light beams emitted by the LED chip and emitted to the side rear are improved, and 360° uniform light emission is achieved. The lighting effect comparable to that of the conventional vehicle lamps such as halogen lamps and xenon lamps is achieved by the double light distribution effect of the light guide member 12 and the light transmission member 11. Meanwhile, the first heat dissipation hole 1111 on the top wall 111 of the light transmission member 11 improves the heat dissipation effect and prevents the light guide member from absorbing part of the light and converting the light into heat during the light transmission process, thereby preventing the light guide member 12 from being damaged by high temperature after long-term use. The fan 16 is positioned closer to the LED chip 132, which can take away the heat more effectively and improve the heat dissipation efficiency. Therefore, the LED vehicle lamp can adapt to greater power without chaotic flashing, which solves the problem that many vehicle models on the market cannot work normally, flash faster, or report fault lights due to insufficient LED power and fault judgment by the on-board computer. Meanwhile, the fan 16 is arranged on a back side of a light emitting surface of the LED chip 132, compared with the common LED vehicle lamp on the market that provides a fan 16 on a top to dissipate heat for an LED chip on multiple surfaces, this avoids the problem of severe light blocking and dark areas caused by the fans. With the arrangement of the fan 16 position, the problem of dark areas is further solved and the lighting efficiency is improved.

Second Embodiment

Figure 9:
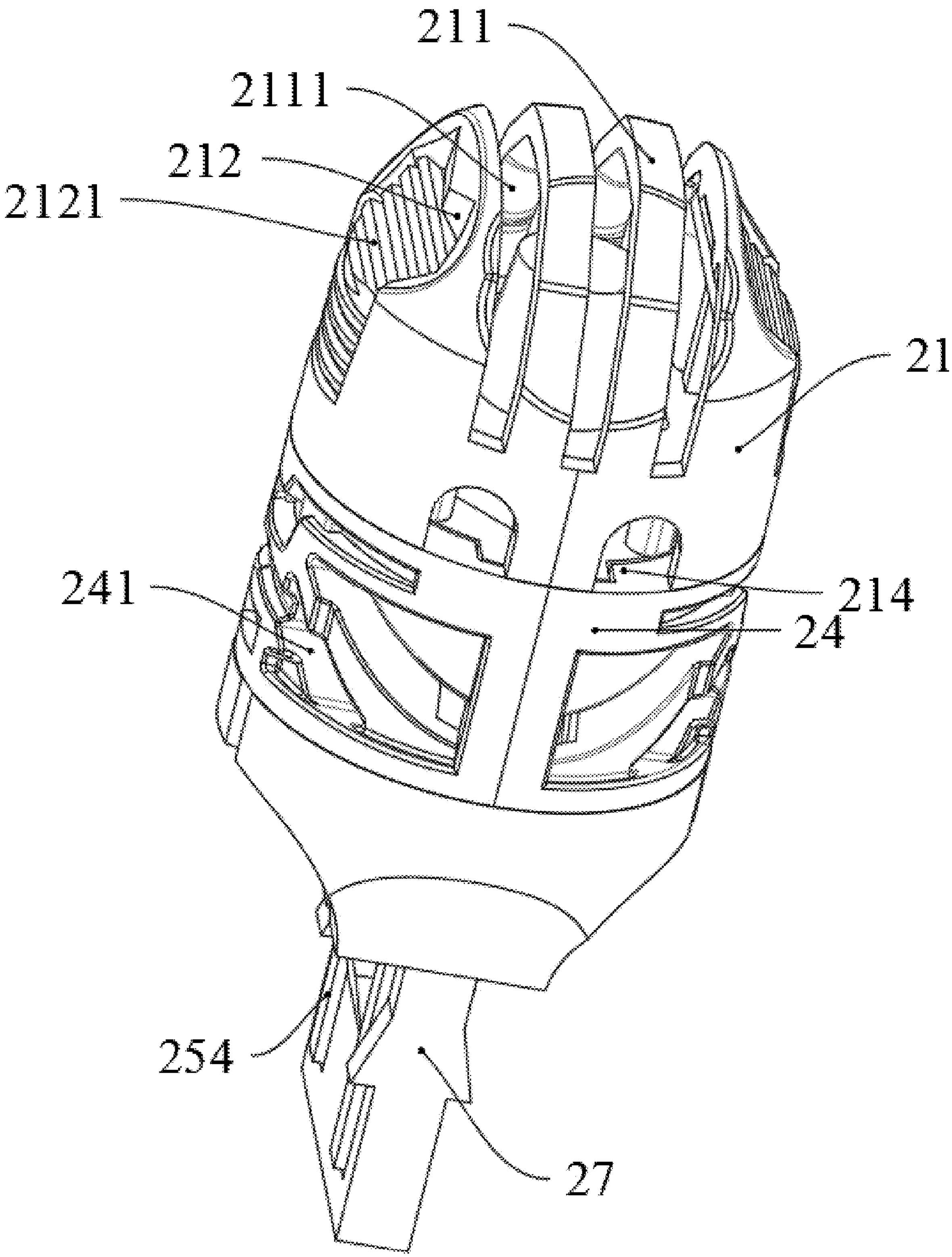
FIG. 9 is a structural view of an LED vehicle lamp according to a second embodiment.
Figure 10:
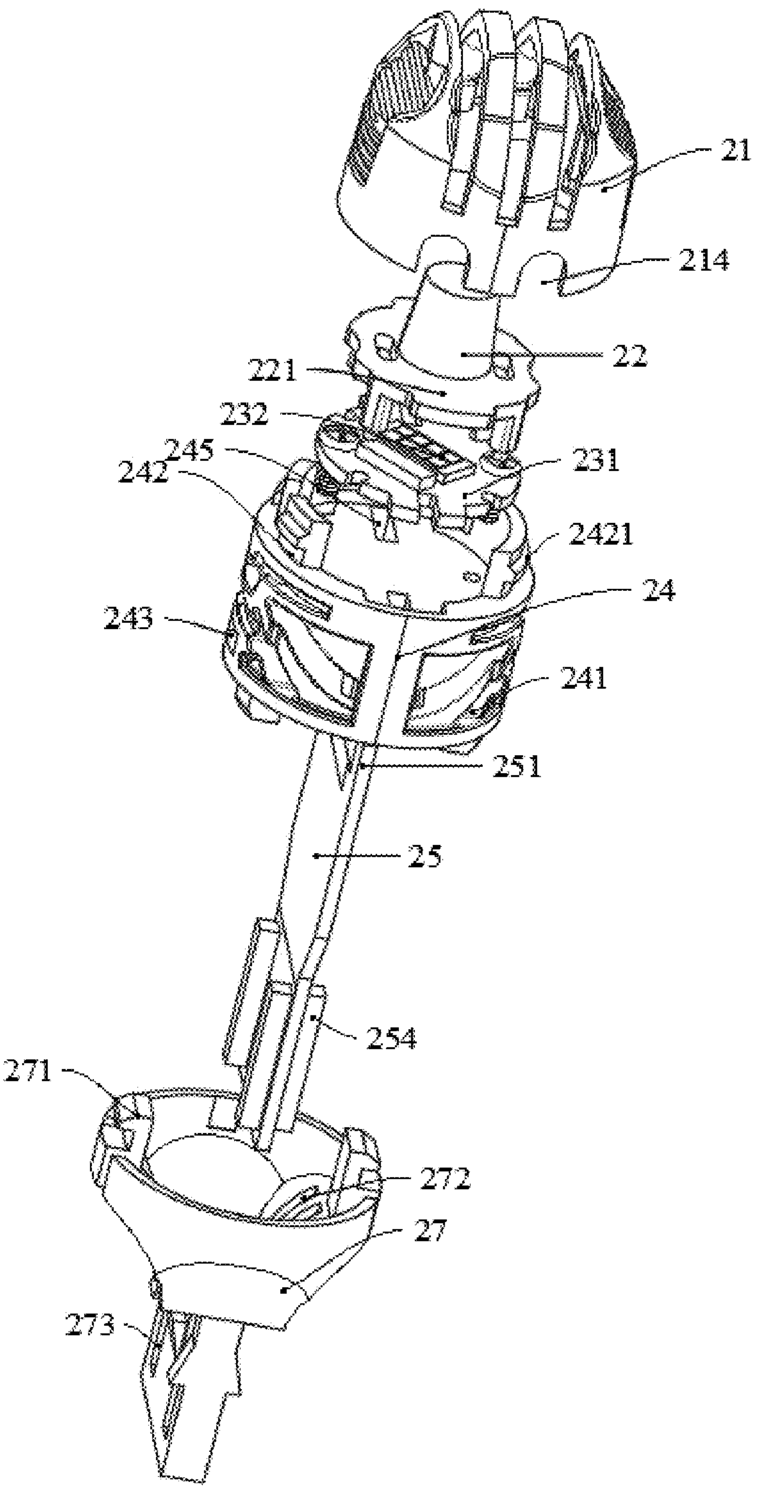
FIG. 10 is an exploded view of an LED vehicle lamp according to a second embodiment.
Figure 11:
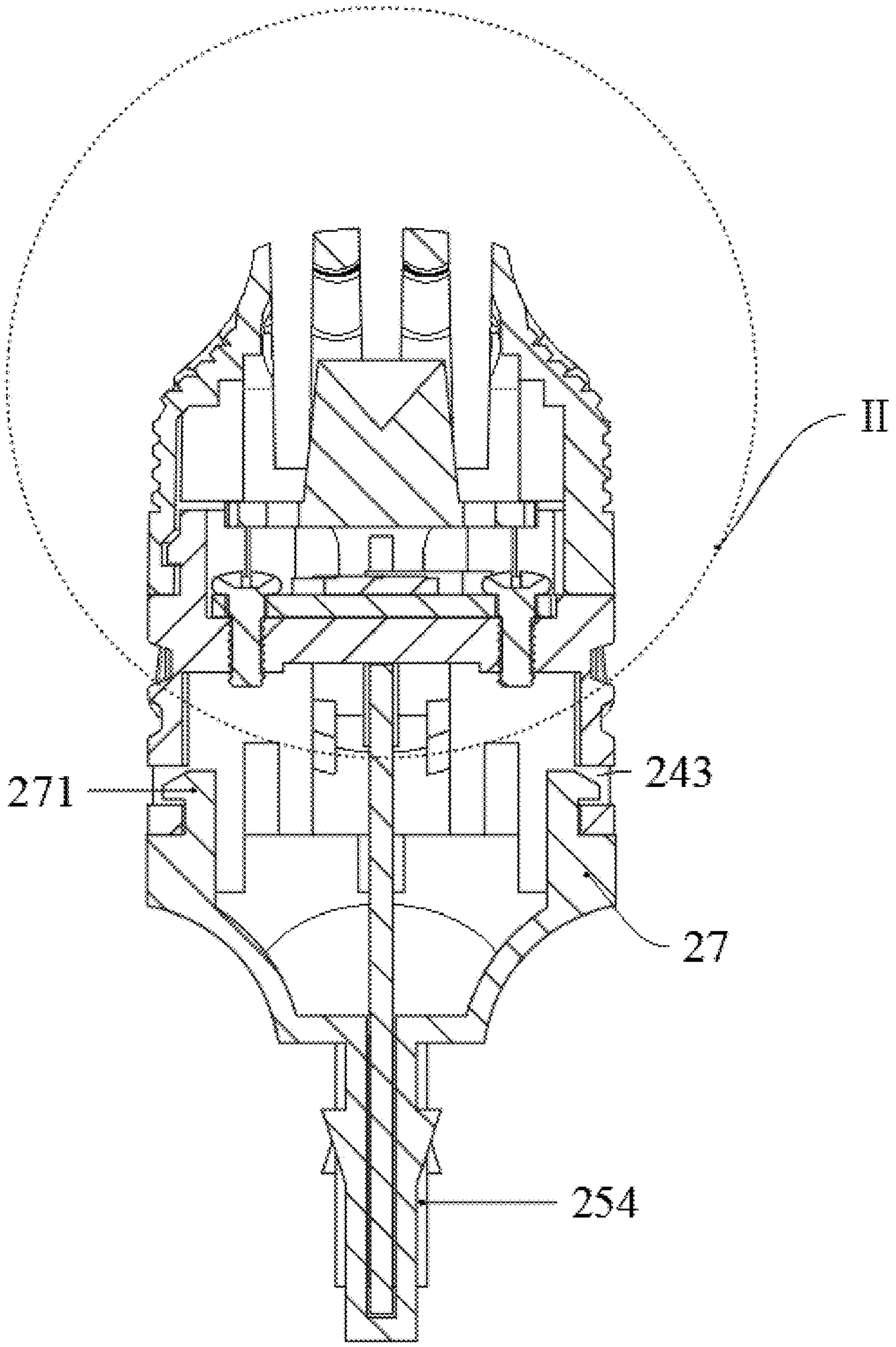
FIG. 11 is a cross-sectional view of an LED vehicle lamp according to a second embodiment.
Figure 12:
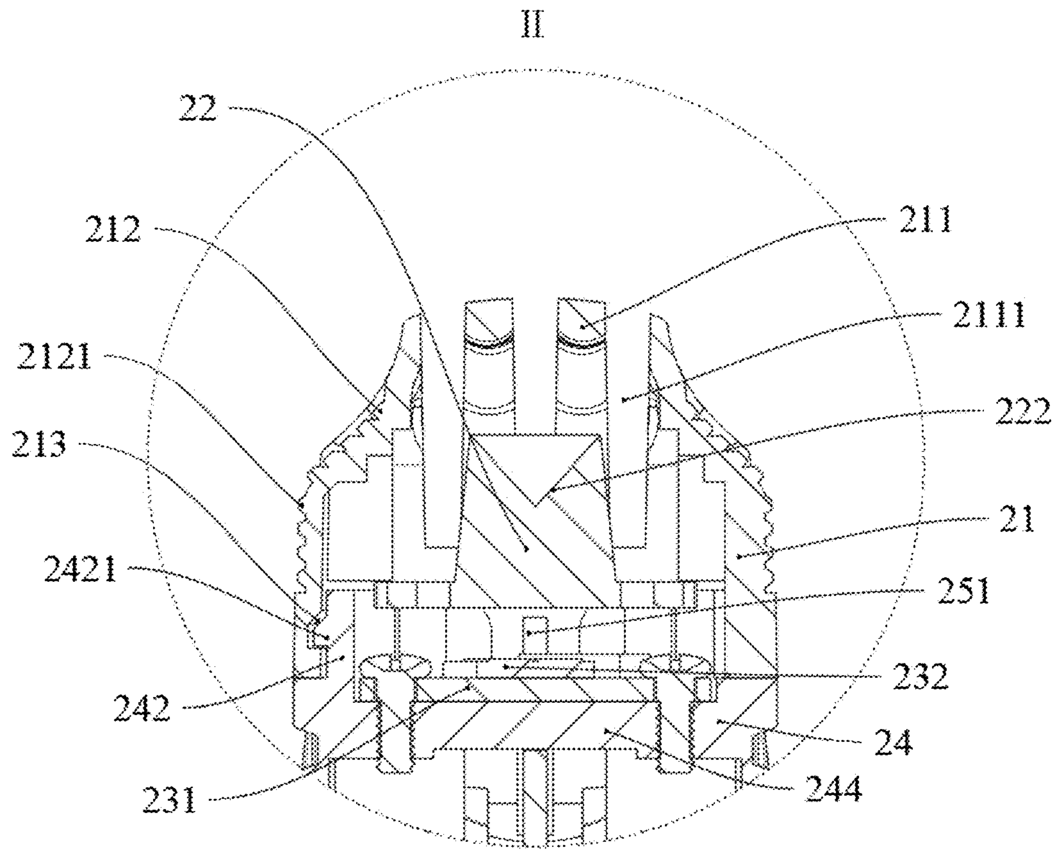
FIG. 12 is an enlarged view of II in FIG. 11.
Figure 13:
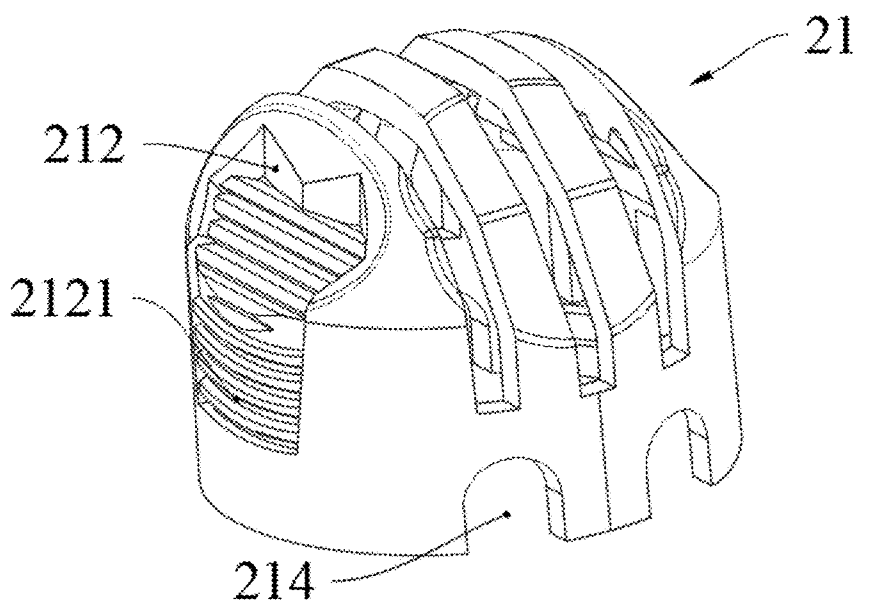
FIG. 13 is a structural view of a light transmission member according to a second embodiment.
Figure 14:
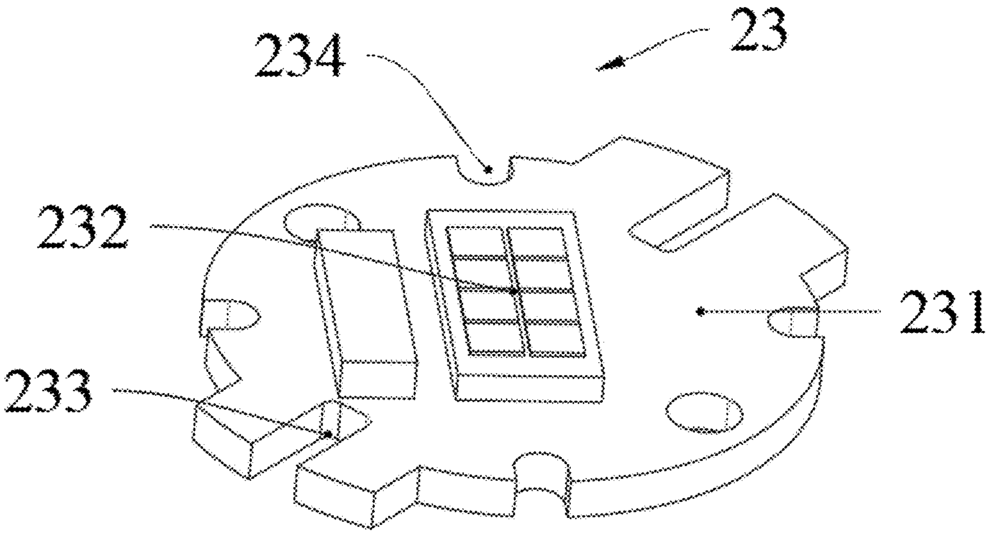
FIG. 14 is a structural view of a light emission source according to a second embodiment.
Figure 15:
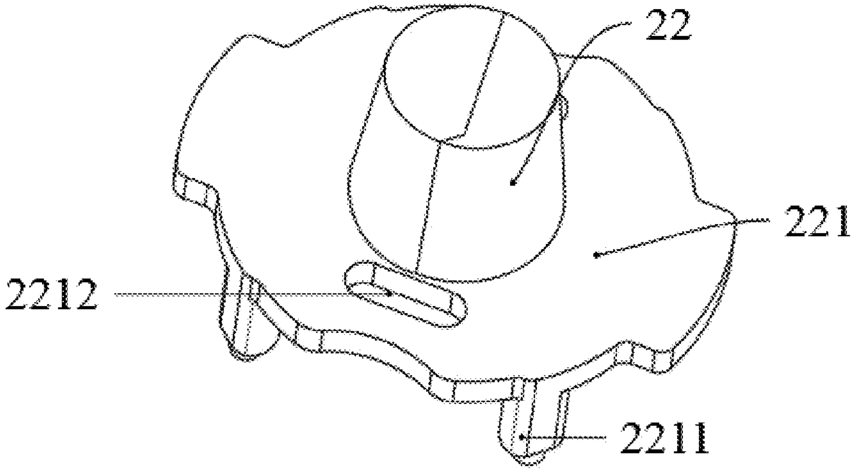
FIG. 15 is a structural view of a light guide member according to a second embodiment.

Referring to FIGS. 9 to 15, the LED vehicle lamp in this embodiment includes a light transmission member 21, a light guide assembly, a light emission source, a first shell 24, a second circuit board 25, a heat dissipation assembly, and a second shell 27. The first shell 24 is positioned above the second shell 27 and connected to the second shell 27, and the light transmission member 21 is sleeved above the first shell 24. The light guide member 22 and the light emission source are both positioned in the light transmission member 21, wherein the light guide member 22 is positioned above the light emission source. The second circuit board 25 and the heat dissipation assembly are positioned in an accommodation cavity formed by the first shell 24 and the second shell 27.

Referring to FIGS. 9 to 12, a peripheral wall of the first shell 24 is cylindrical, and a plurality of second heat dissipation holes 241 are provided on the peripheral wall. One end of the first shell 24 close to the light transmission member 21 is provided with a top surface 244, and the top surface 244 is provided with a gap 245 communicated with the accommodating cavity formed by the first shell 24 and the second shell 27, and a width of the gap 245 is equal to or greater than a thickness of the second circuit board 25. A clamping groove 243 is provided on the peripheral wall of the first shell 24 close to the second shell 27, a clamping buckle 271 is provided at one end of the second shell 27 close to the first shell 24, and the clamping buckle 271 and the clamping groove 243 are matched to achieve the connection between the first shell 24 and the second shell 27.

One end of the second circuit board 35 close to the top surface 244 of the first shell 24 is provided with an extending portion 251, and the extending portion 251 passes through the gap 245 of the first shell 24 along a vertical direction and extends out of the first shell 24. A fin-shaped first heat sink is formed on the first shell 24, second heat dissipation holes 241 are also formed on the first heat sink, and each of the second heat dissipation holes 241 is positioned between two adjacent fins of the first heat sink. A fin-shaped second heat sink is formed on the second shell 27, third heat dissipation holes 272 are also formed on the second heat sink, each of the third heat dissipation holes 272 is positioned between two adjacent fins of the second heat sink, and the third heat dissipation holes 272 are positioned below the second heat dissipation holes 241. An abutting contact pin 254 is provided at one end of the second circuit board 25 far away from the top surface 244 of the first shell 24. The second shell 27 is provided with a second through hole 273, and the abutting contact pin 254 extends out of the second through hole 273. The abutting contact pin 254 is configured to electrically connect to an external power supply. In this embodiment, the third heat dissipation hole 272 is an air inlet, and the second heat dissipation hole 241 is an air outlet; alternatively, the third heat dissipation hole 27 is an air outlet, and the second heat dissipation hole 41 is an air inlet.

Referring to FIGS. 9 to 13, a second protrusion 242 extends along a vertical direction from one end of the first shell 24 close to the light transmission member 21, and a third protrusion 2421 extending outward is provided on an outer peripheral wall of the second protrusion 242. An inner peripheral wall of the light transmission member 21 is provided with a groove 213, and the groove 213 is matched with the third protrusion 2421 to allow the light transmission member 21 to be sleeved on the first shell 24. The light transmission member 21 includes an approximately arc-shaped top wall 211 and a peripheral wall 212, and the top wall 211 and the peripheral wall 212 are transparent. The top wall 211 of the light transmission member 21 is provided with a plurality of first heat dissipation holes 2111. In this embodiment, the first heat dissipation holes 2111 are through holes having arc-shaped cross sections. The peripheral wall 212 of the light transmission member 21 is provided with stripes 2121 extending along a horizontal direction. In this embodiment, the stripes 2121 are trapezoidal in cross section. The peripheral wall 212 of the light transmission member 21 is provided with at least one notch 214, and the notch 214 is formed by extending upward from a bottom edge of the peripheral wall 212. In this embodiment, two groups of notches 214 are provided, one group including two notches 214 symmetrically arranged. During the long-term use of the LED chip 232, a light source surface radiates air to generate hot air gathering in an area above the LED chip 232, and this area is small and the temperature rises quickly. When the temperature rises to 120° C. to 150° C., the light transmission member provided outside deforms and bubbles, which not only affects the light transmittance, but also causes the light transmission member to melt after long-term use, affecting the service life of the LED vehicle lamp. According to the present invention, the notch 214 is arranged on the peripheral wall 212 of the light transmission member 21, and the notch 214 is formed by extending upward from a bottom edge of the peripheral wall 212, which is closer to the LED chip 232, i.e., a light emission source, so that a better heat dissipation effect is achieved, the generated hot air can be diffused and cooled as soon as possible, and deformation and damage to the light transmission member 21 are avoided.

Referring to FIGS. 9 to 14, the light emission source includes a first circuit board 231 and an LED chip 232. The first circuit board 231 is arranged on the top surface 244 of the first shell 24, the LED chip 232 is soldered on the first circuit board 231, and the LED chip 232 may be fixed on the first circuit board 231 by other methods known to those skilled in the art. The first circuit board 231 is perpendicular to the second circuit board 25, the first circuit board 231 is circumferentially provided with a first mounting groove 233, and at least a part of the extending portion 251 of the second circuit board 25 extends into the first mounting groove 233. In this embodiment, the extending portion 251 of the second circuit board 25 passes through the first mounting groove 233. The extending portion 251 of the second circuit board 25 abuts against the first mounting groove 233 to electrically connect the first circuit board 231 to the second circuit board 25. Preferably, the second circuit board 25 in this embodiment is an aluminum board, which has good thermal and electrical conductivity.

Referring to FIGS. 9 to 15, the light guide assembly includes a light guide member 22, a support 221 is sleeved on a circumferential wall of the light guide member 22, and supporting legs 2211 extend from one surface of the support 221 facing the first circuit board 231. The first circuit board 231 is circumferentially provided with a second mounting groove 234, and the supporting legs 2211 pass through the second mounting groove 234 and abut against the top surface 244 of the first shell 24. The light guide member 22 is positioned directly above the LED chip 232, and a light emitting surface of the LED chip 232 faces the light guide member 22. The light guide member 22 is cylindrical or truncated cone-shaped, and the light guide member 22 is transparent. One surface of the light guide member 22 far away from the LED chip 232 is recessed to form a recessed conical surface 222, the recessed conical surface 222 is a surface of revolution and is recessed toward the LED chip 232, and an axis of the recessed conical surface 222 is positioned on a circumference of the light guide member 2 the light guide member 22. An area of the recessed conical surface 222 close to a vertex may be an electroplated area or an area coated with a high-reflection film, so that a light beam incident on this area can be reflected at the recessed conical surface 222. An area of the recessed conical surface 222 far away from a vertex may be a roughened area, such as a frosted area, so that the refraction direction of the light beam incident on the roughened area is changed. In this embodiment, the support 221 is provided with a third through hole 2212, two third through holes 2212 are provided, and the third through hole 2212 is arranged on the support 221 along a circumferential direction of the light guide member 22. The arrangement of the third through hole 2212 further helps the LED chip 232 and the light guide member 22 to dissipate heat.

The LED vehicle lamp in this embodiment provides stripes 2121 on the peripheral wall 212 of the light transmission member 21, so that passing light is diffused and irradiated to a side rear, light beams emitted by the LED chip 232 and emitted to the side rear are improved, and 360° uniform light emission is achieved. The lighting effect comparable to that of the conventional vehicle lamps such as halogen lamps and xenon lamps is achieved by the double light distribution effect of the light guide member 22 and the light transmission member 21. Meanwhile, the first heat dissipation hole 2111 on the top wall 211 of the light transmission member 21 improves the heat dissipation effect and prevents the light guide member from absorbing part of the light and converting the light into heat during the light transmission process, thereby preventing the light guide member 22 from being damaged by high temperature after long-term use.

Third Embodiment

Figure 16:
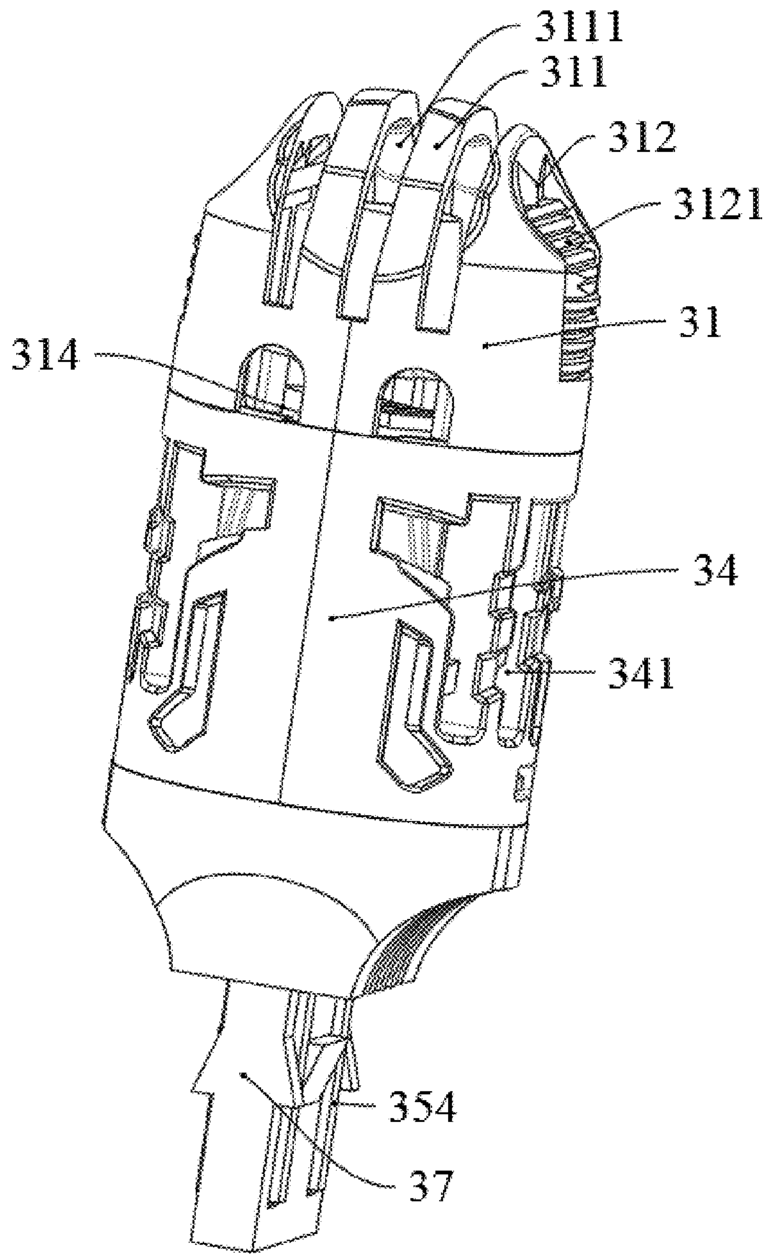
FIG. 16 is a structural view of an LED vehicle lamp according to a third embodiment.
Figure 17:
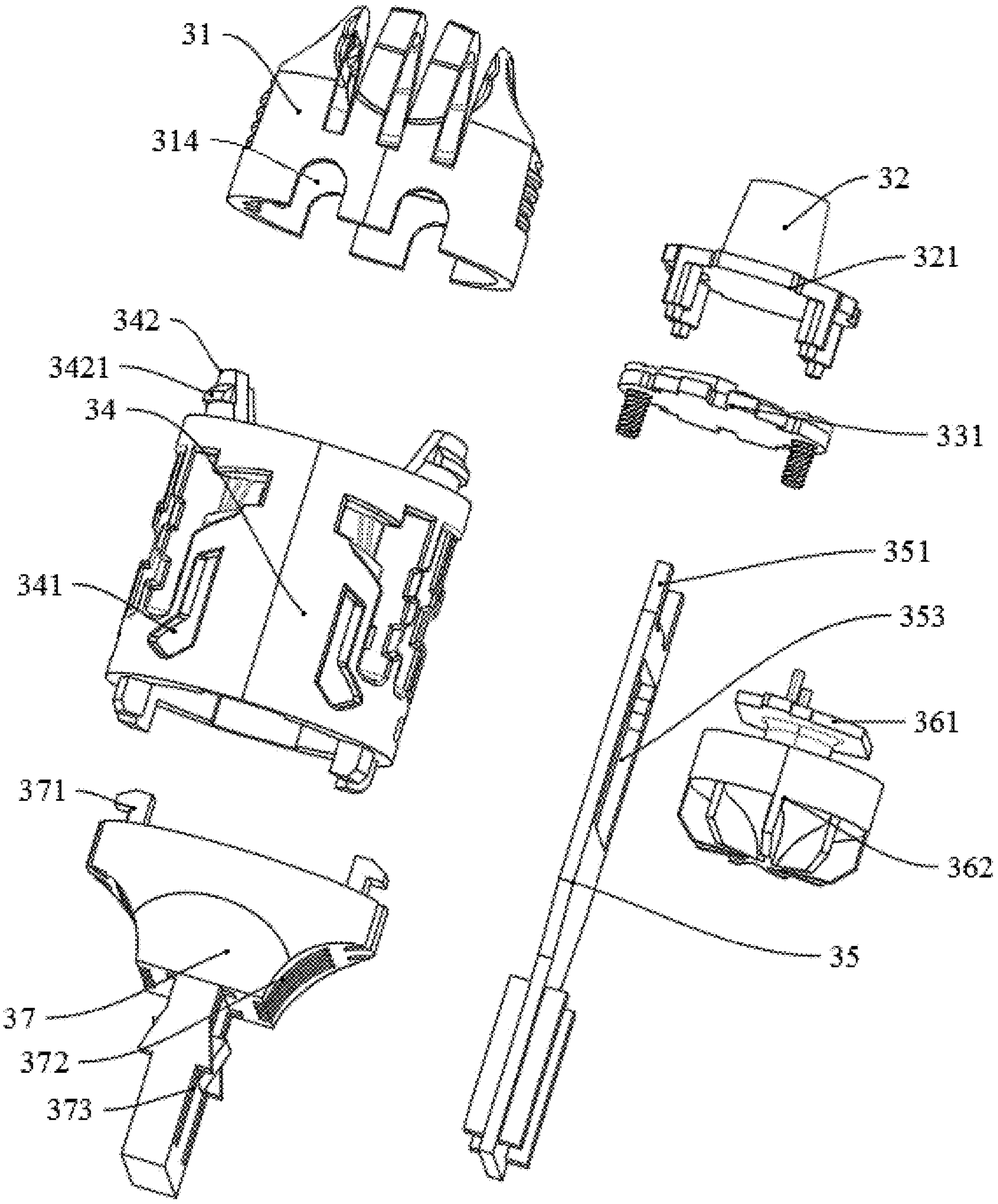
FIG. 17 is an exploded view of an LED vehicle lamp according to a third embodiment.
Figure 18:
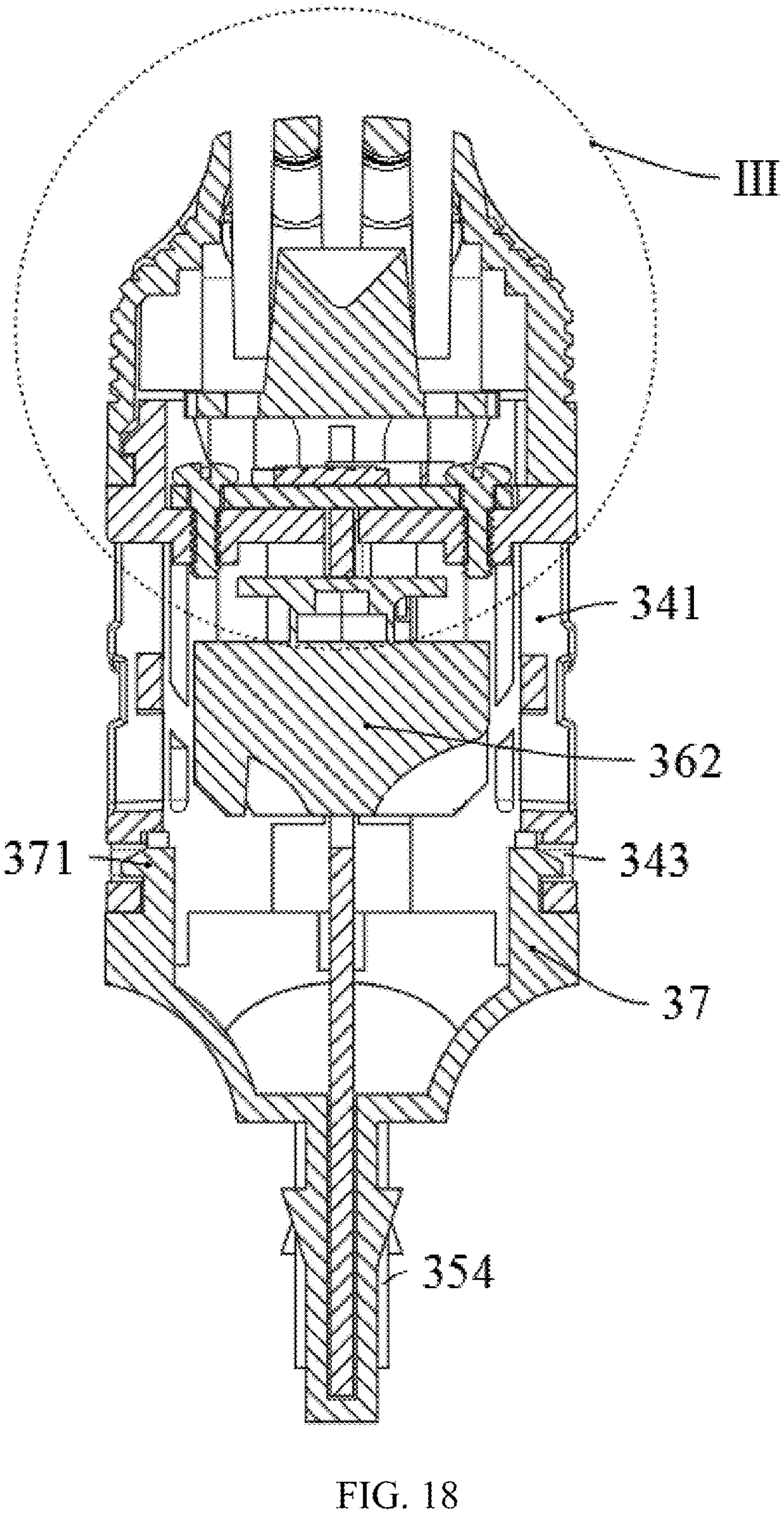
FIG. 18 is a cross-sectional view of an LED vehicle lamp according to a third embodiment.
Figure 19:
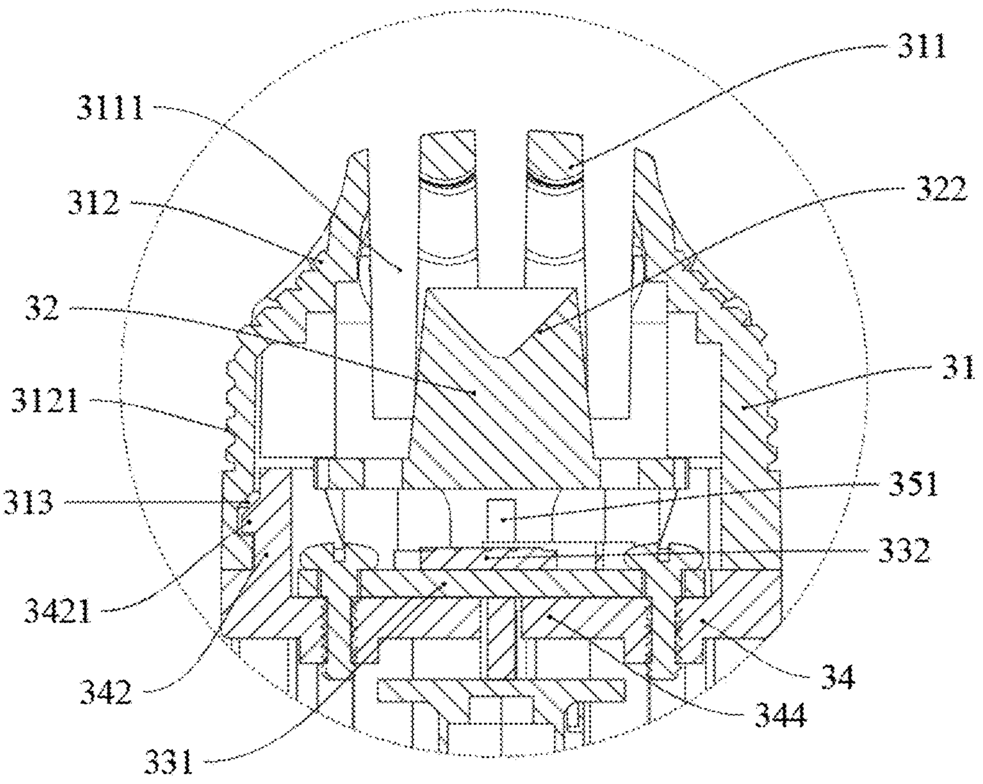
FIG. 19 is an enlarged view of III in FIG. 18.
Figure 20:
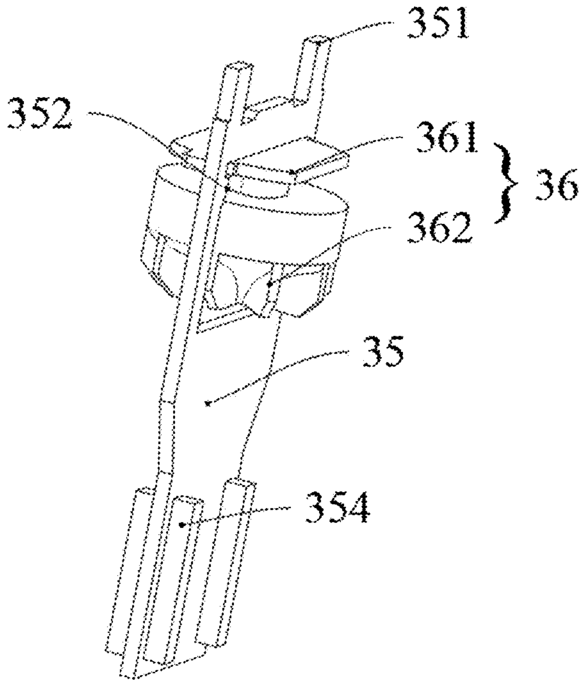
FIG. 20 is a structural view of a second circuit board and a heat dissipation assembly according to a third embodiment.
Figure 21:
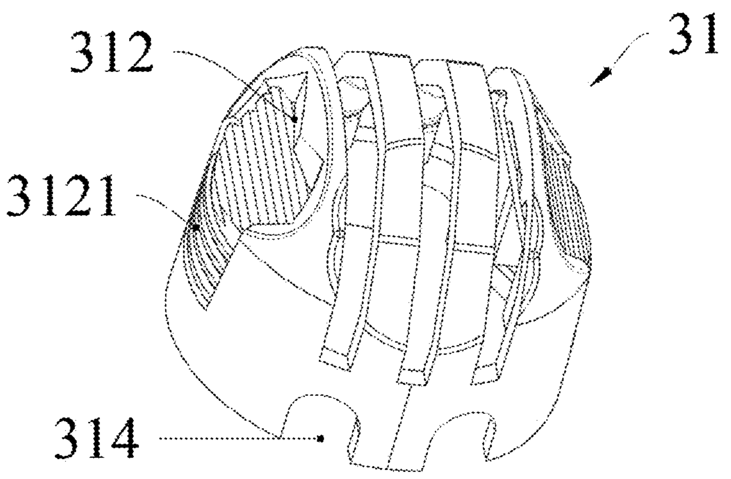
FIG. 21 is a structural view of a light transmission member according to a third embodiment.
Figure 22:
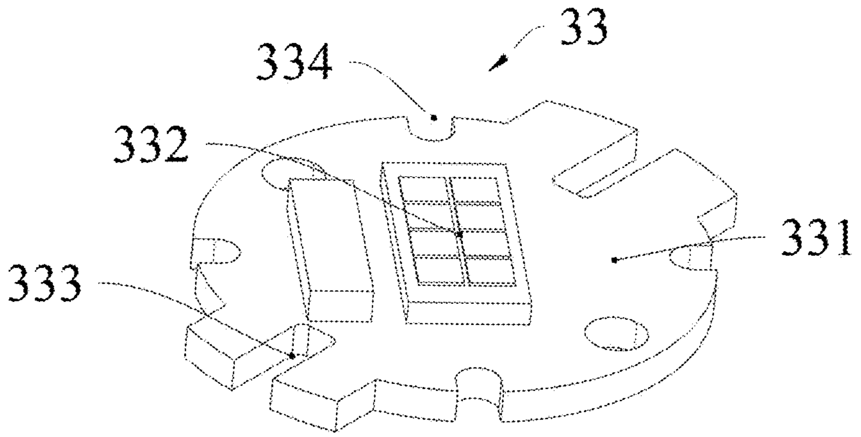
FIG. 22 is a structural view of a light emission source according to a third embodiment.
Figure 23:
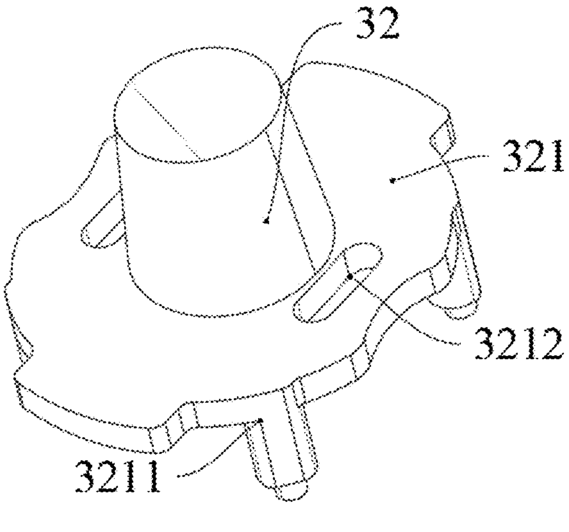
FIG. 23 is a structural view of a light guide member according to a third embodiment.

Referring to FIGS. 16 to 23, the LED vehicle lamp in this embodiment includes a light transmission member 31, a light guide assembly, a light emission source, a first shell 34, a second circuit board 35, a heat dissipation assembly, and a second shell 37. The first shell 34 is positioned above the second shell 37 and connected to the second shell 37, and the light transmission member 31 is sleeved above the first shell 34. The light guide member 32 and the light emission source are both positioned in the light transmission member 31, wherein the light guide member 32 is positioned above the light emission source. The second circuit board 35 and the heat dissipation assembly are positioned in an accommodation cavity formed by the first shell 34 and the second shell 37.

Referring to FIGS. 16 to 19, a peripheral wall of the first shell 34 is cylindrical, and a plurality of second heat dissipation holes 341 are provided on the peripheral wall. One end of the first shell 34 close to the light transmission member 31 is provided with a top surface 344, and the top surface 344 is provided with a gap 345 communicated with the accommodating cavity formed by the first shell 34 and the second shell 37, and a width of the gap 345 is equal to or greater than a thickness of the second circuit board 35. A clamping groove 343 is provided on the peripheral wall of the first shell 34 close to the second shell 37, a clamping buckle 371 is provided at one end of the second shell 37 close to the first shell 34, and the clamping buckle 371 and the clamping groove 343 are matched to achieve the connection between the first shell 34 and the second shell 37.

Referring to FIGS. 16 to 20, one end of the second circuit board 35 close to the top surface 344 of the first shell 34 is provided with an extending portion 351, and the extending portion 351 passes through the gap 345 of the first shell 34 along a vertical direction and extends out of the first shell 34. A first through hole 353 is provided on the second circuit board 35 along a horizontal direction, and a side wall of the first through hole 353 extending along a vertical direction is provided with a first protrusion 352 extending toward the inside of the first through hole 353 along a horizontal direction. A fan 36 is provided in the first through hole 353, the fan 36 includes a driving portion and a fan blade portion 362, the driving portion includes a mounting plate 361, and the mounting plate 361 is arranged on the first protrusion 352. The mounting plate 361 is electrically connected to the second circuit board 35. The driving portion drives the fan blade portion to rotate. A fin-shaped first heat sink is formed on the first shell 34, second heat dissipation holes 341 are also formed on the first heat sink, and each of the second heat dissipation holes 341 is positioned between two adjacent fins of the first heat sink. A fin-shaped second heat sink is formed on the second shell 37, third heat dissipation holes 372 are also formed on the second heat sink, each of the third heat dissipation holes 372 is positioned between two adjacent fins of the second heat sink, and the third heat dissipation holes 372 are positioned below the fan blade portion 362. An abutting contact pin 354 is provided at one end of the second circuit board 35 far away from the top surface 344 of the first shell 34. The second shell 37 is provided with a second through hole 373, and the abutting contact pin 354 extends out of the second through hole 373. The abutting contact pin 354 is configured to electrically connect to an external power supply. In this embodiment, the third heat dissipation hole 372 is an air inlet, the second heat dissipation hole 341 is an air outlet, and the fan 36 is a turbofan, so that the air can be blown out from the side to achieve a good heat dissipation effect.

Referring to FIGS. 16 to 21, a second protrusion 342 extends along a vertical direction from one end of the first shell 34 close to the light transmission member 31, and a third protrusion 3421 extending outward is provided on an outer peripheral wall of the second protrusion 342. An inner peripheral wall of the light transmission member 31 is provided with a groove 313, and the groove 313 is matched with the third protrusion 3421 to allow the light transmission member 31 to be sleeved on the first shell 34. The light transmission member 31 includes an approximately arc-shaped top wall 311 and a peripheral wall 312, and the top wall 311 and the peripheral wall 312 are transparent. The top wall 311 of the light transmission member 31 is provided with a plurality of first heat dissipation holes 3111. In this embodiment, the first heat dissipation holes 3111 are through holes having arc-shaped cross sections. The peripheral wall 312 of the light transmission member 31 is provided with stripes 3121 extending along a horizontal direction. In this embodiment, the stripes 3121 are trapezoidal in cross section. The peripheral wall 312 of the light transmission member 31 is provided with at least one notch 314, and the notch 314 is formed by extending upward from a bottom edge of the peripheral wall 312. In this embodiment, two groups of notches 314 are provided, one group including two notches 314 symmetrically arranged. During the long-term use of the LED chip 332, a light source surface radiates air to generate hot air gathering in an area above the LED chip 332, and this area is small and the temperature rises quickly. When the temperature rises to 120° C. to 150° C., the light transmission member provided outside deforms and bubbles, which not only affects the light transmittance, but also causes the light transmission member to melt after long-term use, affecting the service life of the LED vehicle lamp. According to the present invention, the notch 314 is arranged on the peripheral wall 312 of the light transmission member 31, and the notch 314 is formed by extending upward from a bottom edge of the peripheral wall 312, which is closer to the LED chip 332, i.e., a light emission source, so that a better heat dissipation effect is achieved, the generated hot air can be diffused and cooled as soon as possible, and deformation and damage to the light transmission member 31 are avoided.

Referring to FIGS. 16 to 22, the light emission source includes a first circuit board 331 and an LED chip 332. The first circuit board 331 is arranged on the top surface 344 of the first shell 34, the LED chip 332 is soldered on the first circuit board 331, and the LED chip 332 may be fixed on the first circuit board 331 by other methods known to those skilled in the art. The first circuit board 331 is perpendicular to the second circuit board 35, the first circuit board 331 is circumferentially provided with a first mounting groove 333, and at least a part of the extending portion 351 of the second circuit board 35 extends into the first mounting groove 333. In this embodiment, the extending portion 351 of the second circuit board 35 passes through the first mounting groove 333. The extending portion 351 of the second circuit board 35 abuts against the first mounting groove 333 to electrically connect the first circuit board 331 to the second circuit board 35. Preferably, the second circuit board 35 in this embodiment is an aluminum board, which has good thermal and electrical conductivity.

Referring to FIGS. 16 to 23, the light guide assembly includes a light guide member 32, a support 321 is sleeved on a circumferential wall of the light guide member 32, and supporting legs 3211 extend from one surface of the support 321 facing the first circuit board 331. The first circuit board 331 is circumferentially provided with a second mounting groove 334, and the supporting legs 3211 pass through the second mounting groove 334 and abut against the top surface 344 of the first shell 34. The light guide member 32 is positioned directly above the LED chip 332, and a light emitting surface of the LED chip 332 faces the light guide member 32. The light guide member 32 is cylindrical or truncated cone-shaped, and the light guide member 32 is transparent. One surface of the light guide member 32 far away from the LED chip 332 is recessed to form a recessed conical surface 322, the recessed conical surface 322 is a surface of revolution and is recessed toward the LED chip 332, and an axis of the recessed conical surface 322 is positioned on a circumference of the light guide member 32. An area of the recessed conical surface 322 close to a vertex may be an electroplated area or an area coated with a high-reflection film, so that a light beam incident on this area can be reflected at the recessed conical surface 322. An area of the recessed conical surface 322 far away from a vertex may be a roughened area, such as a frosted area, so that the refraction direction of the light beam incident on the roughened area is changed. In this embodiment, the support 321 is provided with a third through hole 3212, two third through holes 3212 are provided, and the third through hole 3212 is arranged on the support 321 along a circumferential direction of the light guide member 32. The arrangement of the third through hole 3212 further helps the LED chip 332 and the light guide member 32 to dissipate heat.

The LED vehicle lamp in this embodiment provides stripes 3121 on the peripheral wall 312 of the light transmission member 31, so that passing light is diffused and irradiated to a side rear, light beams emitted by the LED chip 332 and emitted to the side rear are improved, and 360° uniform light emission is achieved. The lighting effect comparable to that of the conventional vehicle lamps such as halogen lamps and xenon lamps is achieved by the double light distribution effect of the light guide member 32 and the light transmission member 31. Meanwhile, the first heat dissipation hole 3111 on the top wall 311 of the light transmission member 31 improves the heat dissipation effect and prevents the light guide member from absorbing part of the light and converting the light into heat during the light transmission process, thereby preventing the light guide member 32 from being damaged by high temperature after long-term use. The fan 36 is positioned closer to the LED chip 332, which can take away the heat more effectively and improve the heat dissipation efficiency. Therefore, the LED vehicle lamp can adapt to greater power without chaotic flashing, which solves the problem that many vehicle models on the market cannot work normally, flash faster, or report fault lights due to insufficient LED power and fault judgment by the on-board computer. Meanwhile, the fan 36 is arranged on a back side of a light emitting surface of the LED chip 332, compared with the common LED vehicle lamp on the market that provides a fan 36 on a top to dissipate heat for an LED chip on multiple surfaces, this avoids the problem of severe light blocking and dark areas caused by the fans. With the arrangement of the fan 36 position, the problem of dark areas is further solved and the lighting efficiency is improved.

Finally, it should be emphasized that the above are only preferred embodiments of the present invention and are not intended to limit the present invention. For those skilled in the art, the present invention may have various changes and modifications. Any modifications, equivalent replacements, improvements, and the like made within the spirit and principles of the present invention should be included in the protection scope of the present invention.

The invention claimed is:

1. An LED vehicle lamp, comprising: a first circuit board, wherein an LED chip is provided on the first circuit board, a light guide member is provided on one side of a light emitting surface of the LED chip, the light guide member is a transparent and positioned right above the LED chip, and light transmission members are provided outside the light guide member, the first circuit board and the LED chip;

and wherein each of the light transmission members comprises a top wall and a peripheral wall, the peripheral wall is transparent, at least one first heat dissipation hole is provided on the top wall, and stripes extending along a horizontal direction are provided on the peripheral wall of the light transmission member, the stripes are used to diffuse the passing light;

the LED vehicle lamp further comprises a second circuit board, the second circuit board is perpendicular to and electrically connected to the first circuit board, the first circuit board is circumferentially provided with a first mounting groove, an extending portion is provided at one end of the second circuit board close to the first circuit board, and at least a part of the extending portion extends into the first mounting groove and abuts against the first mounting groove.

2. The LED vehicle lamp according to claim 1, wherein the peripheral wall of the light transmission member is provided with at least one notch, and the notch is formed by extending upward from a bottom edge of the peripheral wall.

3. The LED vehicle lamp according to claim 1, wherein one end of the second circuit board far away from the first circuit board is provided with an abutting contact pin.

4. The LED vehicle lamp according to claim 3, wherein the second circuit board is an aluminum board.

5. The LED vehicle lamp according to claim 3, wherein a first through hole is provided on the second circuit board along a horizontal direction, and a fan is provided in the first through hole.

6. The LED vehicle lamp according to claim 5, wherein the fan is a turbofan.

7. The LED vehicle lamp according to claim 5, wherein a first protrusion extending toward the inside of the first through hole in a horizontal direction is provided on a side wall of the first through hole in a vertical direction, the fan is provided with a mounting plate, the mounting plate is arranged on the first protrusion, and the mounting plate is electrically connected to the second circuit board.

8. The LED vehicle lamp according to claim 3, wherein the second circuit board is externally provided with a first shell and a second shell mutually connected, and the first shell is positioned above the second shell; and the second shell is provided with a second through hole, and the abutting contact pin extends out of the second through hole.

9. The LED vehicle lamp according to claim 8, wherein the first shell is positioned below the light transmission member, a second protrusion extends along a vertical direction from one end of the first shell close to the light transmission member, and a third protrusion extending outward is provided on an outer peripheral wall of the second protrusion; and an inner peripheral wall of the light transmission member is provided with a groove, and the groove is matched with the third protrusion.

10. The LED vehicle lamp according to claim 8, wherein the first circuit board is arranged on a top surface of the first shell, a gap communicated with the first shell is formed on the top surface, and the extending portion of the second circuit board passes through the gap.

11. The LED vehicle lamp according to claim 8, wherein a support is sleeved on a circumferential wall of the light guide member, and supporting legs extend from one surface of the support facing the first circuit board; and the first circuit board is circumferentially provided with a second mounting groove, and the supporting legs pass through the second mounting groove and abut against the top surface of the first shell.

12. The LED vehicle lamp according to claim 11, wherein the support is provided with a third through hole, at least one third through hole is provided, and the third through hole is arranged on the support along a circumferential direction of the light guide member.

13. The LED vehicle lamp according to claim 1, wherein one surface of the light guide member far away from the LED chip is recessed toward a direction of the LED chip to form a recessed conical surface.

14. The LED vehicle lamp according to claim 1, wherein a cross section of the stripe is semicircular.

15. The LED vehicle lamp according to claim 1, wherein a cross section of the stripe is trapezoidal.

* * * * *